United States Patent
Bruns

(10) Patent No.: US 10,805,778 B2
(45) Date of Patent: Oct. 13, 2020

(54) PROVIDING AN ITEM OF INFORMATION FROM A GROUP OF A PLURALITY OF MOTOR VEHICLES

(71) Applicant: Audi AG, Ingolstadt (DE)

(72) Inventor: Erich Bruns, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/341,344

(22) PCT Filed: Oct. 13, 2017

(86) PCT No.: PCT/EP2017/076159
§ 371 (c)(1),
(2) Date: Apr. 11, 2019

(87) PCT Pub. No.: WO2018/082900
PCT Pub. Date: May 11, 2018

(65) Prior Publication Data
US 2020/0029190 A1 Jan. 23, 2020

(30) Foreign Application Priority Data
Nov. 3, 2016 (DE) .................. 10 2016 221 557

(51) Int. Cl.
*H04W 4/44* (2018.01)
*H04W 4/029* (2018.01)
(Continued)

(52) U.S. Cl.
CPC ............... *H04W 4/44* (2018.02); *G08G 1/00* (2013.01); *H04L 29/08* (2013.01); *H04W 4/029* (2018.02); *H04W 64/003* (2013.01)

(58) Field of Classification Search
None
See application file for complete search history.

(56) References Cited

U.S. PATENT DOCUMENTS 9,189,961 B2 11/2015 Mehr et al.
2011/0095908 A1 4/2011 Nadeem et al.
(Continued)

FOREIGN PATENT DOCUMENTS

CN 102883274 A 1/2013
CN 103078930 A 5/2013
(Continued)

OTHER PUBLICATIONS

IInternational Preliminary Report on Patentability directed to related International Patent Application No. PCT/EP2017/076159, completed Oct. 11, 2018, with attached English-language translation; 17 pages.

(Continued)

*Primary Examiner* — Thomas S McCormack
(74) *Attorney, Agent, or Firm* — Sterne, Kessler, Goldstein & Fox P.L.L.C.

(57) ABSTRACT

A method is disclosed for providing information by a motor vehicle, including supplying sensor data, recorded in the motor vehicle, to a particularly extensive network outside the motor vehicle. The method comprises the steps of: a central controller receiving an information request from a requesting unit, selecting the motor vehicle for providing the information from a plurality of motor vehicles in accordance with a specified selection criterion, the central controller transmitting, to the selected motor vehicle, a control signal for controlling a recording device of the selected motor vehicle, receiving the information, recorded as a result of the control signal, from the recording device of the selected motor vehicle, and the central controller providing the information for the requesting unit. A central controller is also disclosed.

12 Claims, 1 Drawing Sheet

(51) Int. Cl.
  *G08G 1/00* (2006.01)
  *H04L 29/08* (2006.01)
  *H04W 64/00* (2009.01)

(56) References Cited

U.S. PATENT DOCUMENTS

| | | | |
|---|---|---|---|
| 2013/0265983 | A1 | 10/2013 | Jelinek |
| 2014/0094992 | A1* | 4/2014 | Lambert ............... G07C 5/008 |
| | | | 701/1 |
| 2015/0363986 | A1* | 12/2015 | Hoyos .................. H05K 999/99 |
| | | | 340/5.61 |
| 2016/0057335 | A1 | 2/2016 | Pisz |
| 2016/0124976 | A1* | 5/2016 | Bai ....................... G08G 1/0112 |
| | | | 707/748 |
| 2017/0259786 | A1 | 9/2017 | Burgkhardt et al. |
| 2017/0274985 | A1* | 9/2017 | Baca ........................ B64C 13/16 |

FOREIGN PATENT DOCUMENTS

| | | |
|---|---|---|
| CN | 103262584 A | 8/2013 |
| CN | 105721238 A | 6/2016 |
| DE | 10204677 A1 | 8/2003 |
| DE | 102012208256 A1 | 11/2013 |
| DE | 102014224481 A1 | 6/2016 |
| DE | 102014225593 A1 | 6/2016 |
| DE | 102015001194 A1 | 8/2016 |
| JP | 2014164316 A | 9/2014 |

OTHER PUBLICATIONS

International Search Report and Written Opinion of the International Searching Authority directed to related International Patent Application No. PCT/EP2017/076159, dated Dec. 22, 2017, with attached English-language translation; 23 pages.

Talasila, et al., "Crowdsensing in the Wild with Aliens and Micropayments," IEEE Pervasive Computing, IEEE Service Center, Bd. 114, Nr. 1, Jan.-Mar. 2016, ISSN: 1536-1268; 10 pages.

Chinese Application No. 201780061592.3, Office Action dated May 14, 2020; English Translation from EPO Global Dossier, 10 pages.

* cited by examiner

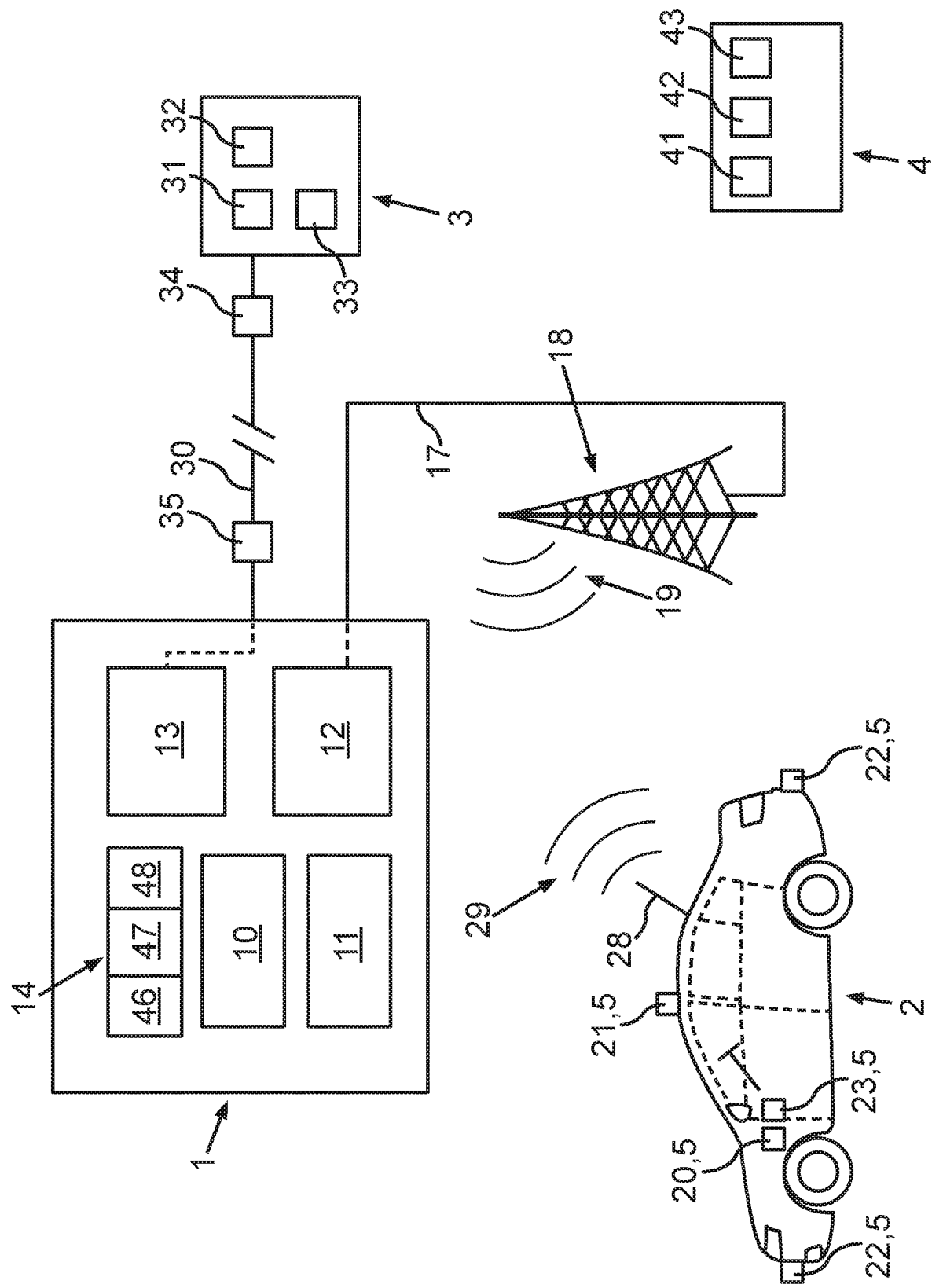

PROVIDING AN ITEM OF INFORMATION FROM A GROUP OF A PLURALITY OF MOTOR VEHICLES

TECHNICAL FIELD

This disclosure relates to a method for providing a requesting unit with information by a motor vehicle. A second aspect of this disclosure relates to a central controller, via which information can be provided by a motor vehicle, in response to a request.

BACKGROUND

According to the prior art, vehicles are equipped with a plurality of sensors to record the surroundings thereof. Said sensors include, for example, temperature sensors, level sensors on the chassis, cameras, radar sensors, and/or GPS sensors. The data that said sensors generate are used to provide vehicle functions, such as a lane departure warning system, traffic jam warning system, or navigation system. The data generated are contained only locally in the vehicle, and in particular the data are not intended to be used by third parties.

DE 102 04 677 A1 provides a system for driver assistance in a motor vehicle, which system records traffic data using sensors on the vehicle and provides said data, as a service, to other vehicles. The data can then be recorded and/or ascertained on the basis of the driver assistance systems of the other vehicles. A remuneration model may be provided for the provision of the data. The provision of the data is regionally restricted by the radio accessibility of the other vehicles. For example, a weather service cannot ascertain weather information from Sicily from a location in Germany.

DE 10 2015 001 194 A1 relates to assigning information from at least one motor vehicle to at least one first object type and one second object type of a classification means. The classification means is designed as an external server comprising a database.

DE 10 2014 224 481 A1 relates to the remote control of functionalities of a vehicle, by means of a mobile terminal. The mobile terminal can actuate specific functionalities of the vehicle, in a vehicle previously selected by the administrative system of the vehicle. In this case, the mobile terminal is identified to the vehicle on the basis of an exchange of identifiers with which both the vehicle and the terminal have previously been provided.

DE 10 2014 225 593 A1 discloses a calculation method involving a server external to a motor vehicle communicating a task, to be solved, to a computer inside the motor vehicle. The server can divide the task to be solved among the computers inside motor vehicles of a plurality of motor vehicles, a calculation time for solving the task being allowed.

DE 10 2012 208 256 A1 describes a method for autonomously tracking a following vehicle on the path of a leading vehicle, the leading vehicle being controlled by a driver and communicating a follow message to the following vehicle by means of vehicle-to-X communication.

US 2016/0124976 A1 describes a public sensor system comprising a central unit and remote units. The remote units receive requests from the central unit and communicate data to the central unit in response to the request. Information such as traffic and weather conditions is provided to the central unit by the remote units, upon request.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 illustrates a schematic view of a central controller, according to some embodiments.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of the disclosed embodiments is that of supplying sensor data, recorded in a motor vehicle, to a user outside the motor vehicle.

This object is achieved by the subjects of the independent claims. Advantageous embodiments comprising expedient developments can be found in the dependent claims, the description, and the FIGURE.

A first aspect of the embodiments relates to a method for providing information by a motor vehicle. To supply the sensor data of the motor vehicle to a user outside the motor vehicle, a method embodiment is based on the concept of a central controller selecting a specific motor vehicle from a plurality of motor vehicles to record information. The central controller may, in particular, comprise a server and/or a database. In general, the central controller firstly receives an information request from a requesting unit. The requesting unit is, for example, an input device, in particular of the central controller, a further server remote from the central controller, a personal computer, or a mobile terminal. The information request can be received by a data link, in particular via the Internet, a radio link, or a wired connection. The central controller can, in particular, receive an information request made automatically by the requesting unit or an information request made by a user via the requesting unit. An information request is intended to be understood as a request by the requesting unit for providing the information.

The central controller receives a position of the motor vehicle continuously, periodically, and/or in response to a position request by the central controller. The position of the motor vehicle is thus always known to the central controller. In particular, as described above, the specified selection criterion for selecting the motor vehicle from the plurality of motor vehicles may make use of the position of the motor vehicle. For the plurality of motor vehicles, in an analogous manner the central controller receives a relevant position of the motor vehicles continuously, periodically, and/or in response to a position request by the central controller.

The motor vehicle for providing the information is selected from the plurality of motor vehicles, in particular by the central controller, according to a specified selection criterion, the selection criterion comprising the specification that the motor vehicle be selected based on the position of the motor vehicle. The motor vehicle is, in particular, selected on the basis of the requested information, at least in part. A control signal for controlling a recording device of the selected motor vehicle is transmitted to the selected motor vehicle by the central controller. The control signal comprises, for example, a command for recording the information by the recording device and/or a command for transmitting the recorded information to the central controller. The recording device of the selected motor vehicle can record the information in response to the control signal. Sensor data, for example, may be recorded as information. In particular, a sensor signal of the recording device is recorded as information. The central controller receives the information, recorded as a result of the control signal, from the recording device of the selected motor vehicle. In particular, the recorded information is ascertained by the central controller by the central controller receiving an information signal transmitted by the motor vehicle. The information signal may be transmitted to the central controller by a communication unit of the selected motor vehicle. The information is provided by the central controller for the requesting unit. In particular, the information is communicated or transmitted by the central controller to the requesting unit. The central controller preferably provides the information for the requesting unit via the same data link as that via which the information request is also received. The present method makes it possible, for example, to request weather information for Sicily using a weather service from Germany as the requesting unit. The weather information can then be recorded, and provided to the weather service, from a motor vehicle located in Sicily.

The control signal can be transmitted to the selected motor vehicle and/or the central controller can receive the information from the recording device via a data link, in particular a radio link, for example, via the cellular network, via Wi-Fi, or via Bluetooth. In particular, the motor vehicle is registered with the central controller, for example, using a vehicle account. The requesting unit and/or a user of the requesting unit is preferably registered with the central controller, for example, using a user account.

In some embodiments, the selection criterion comprises the specification that the motor vehicle be selected on the basis of consent of a vehicle owner of the motor vehicle to provide the information, and/or on the basis of the presence in and/or on the motor vehicle of a device related to the information. For example, the information is related to a geographical position. In this case, as the specified selection criterion, the motor vehicle of which the position has the smallest deviation from the geographical position of the desired information may be selected from the plurality of motor vehicles. Alternatively or additionally, the specified selection criterion may comprise the specification that the motor vehicle of which the vehicle owner has granted consent, in principle, to provide the information, preferably be selected from the plurality of motor vehicles. In this case, it is possible to ascertain and provide the information particularly quickly, because the consent of the vehicle owner of the motor vehicle is already provided. The specified selection criterion may additionally comprise the specification that the motor vehicle be selected from the plurality of motor vehicles on the basis of the presence in and/or on the motor vehicle of a device related to the information. For example, the motor vehicle selected for providing the information is that which comprises a suitable recording device for recording the information. In particular, recording devices present on the motor vehicle may be specified in the vehicle account for this purpose.

In a further embodiment, a counter of the central controller that is related to the motor vehicle is changed by a specified value when the information is provided. The counter is, in particular, linked to the vehicle account. A second counter may be provided, which is linked to the requesting unit or the user account. In particular, both the counter and the second counter are changed by the specified value at the same time, preferably contrariwise. For example, the counter is increased by the specified value when the second counter is reduced by the specified value. In this way, it is possible to provide a remuneration system which remunerates the vehicle owner of the motor vehicle for ascertaining the information. Alternatively or additionally, remuneration of an operator of the central controller may also be provided. In this case, the central controller may be assigned a third counter.

According to another embodiment, an accounting device of the requesting unit is coupled to an accounting device of the motor vehicle, for a remuneration process, when the information is requested and/or provided. The accounting device of the requesting unit and/or the accounting device of the motor vehicle is, for example, a credit account which is, in particular, managed by a payment service provider. Said account is, for example, a PayPal account, a Bitcoin account, known as a Bitcoin wallet, or an account for another cryptocurrency. Preferably, in addition or instead, an accounting device of the central controller is coupled to the accounting device of the requesting unit for a remuneration process. Coupling the respective accounting devices allows for reimbursement of the central controller and/or of the vehicle owner of the motor vehicle. In a further embodiment, the control signal controls at least one sensor of the recording device of the motor vehicle for recording the information. In particular, a sensor signal of the sensor of the recording device can be recorded as information.

According to an embodiment, environmental data, traffic data, and/or route data are recorded as information. The environmental data may, for example, comprise a measured variable of an environment of the motor vehicle, for example, a temperature and/or a precipitation amount and/or a recording signal of the environment of the motor vehicle, for example, an image signal, a radar signal, or an audio signal. The traffic data may comprise a measured value, for example, a speed travelled or a measured traffic density, and/or a recording of a traffic situation, for example, an image signal or a radar signal of the traffic situation. The route data may for example comprise a location, a route travelled, and/or a planned route of the motor vehicle.

According to another embodiment, the control signal requests consent from the vehicle owner to record and/or transfer the information. As a result, the vehicle owner can give or refuse his consent to record and/or transfer the information in each instance of the information being recorded and/or transferred.

A second aspect of the embodiments relates to a central controller for providing information of a motor vehicle. The central controller comprises a first communications unit for receiving an information request from a requesting unit and for providing the information for the requesting unit. In particular, the first communications unit is designed to communicate with the requesting unit. The central controller furthermore comprises an arithmetic unit for selecting the motor vehicle for providing the information, from a plurality of motor vehicles, according to a specified selection criterion, the selection criterion comprising the specification that the motor vehicle be selected based on a position of the motor vehicle. In particular, the arithmetic unit is designed to select the motor vehicle on the basis of the information request. The central controller comprises a second communications unit for transmitting, to the selected motor vehicle, a control signal for controlling a recording device of the selected motor vehicle, and for ascertaining the information, recorded as a result of the control signal, from the recording device of the selected motor vehicle. In particular, the second communications unit is designed for communication with the selected motor vehicle. The central controller is designed to receive a relevant position of the motor vehicles continuously, periodically, and/or in response to a position request by the central controller for the plurality of motor vehicles.

An example embodiment will be described in the following. For this purpose, the individual FIGURE (FIG. 1) is a schematic views of a motor vehicle, a central controller, and a requesting unit.

The embodiment explained in the following is a preferred embodiment. In the embodiment, the described components of the embodiments are in each case individual features that are intended to be considered to be mutually independent of one another and can be arranged or coupled in a combination other than that shown. Furthermore, the described embodiment can also be supplemented by further features that have already been described.

FIG. 1 is a schematic view of a central controller 1. In the present case, the central controller 1 is connected to a requesting unit 3 by a data link 30. An information request 34 is transmitted from the requesting unit 3 to the central controller 1 via the data link 30. Information 35 can be requested using the information request 34. The central controller 1 receives the information request 34, records the information by a motor vehicle 2, and provides the information 35 for the requesting unit 3.

For example, a German weather service may wish to check whether a temperature sensor of a weather station in Sicily is operating correctly. For this purpose, the weather service requires a comparative value. Instead of sending a technician to Sicily, a request, containing the information request 34 for a current temperature value at a geoposition of the weather station, can be transmitted to the central controller 1 by the requesting unit 3, for example, via a computer or server of the weather service. The central controller 1 recognizes, for example, that the motor vehicle 2 is already located approximately at the geoposition of the weather station or that a position of the motor vehicle 2 approximately corresponds to the geoposition of the weather station. A vehicle owner of the motor vehicle 2 can receive a request, via the control signal, as to whether he wishes to record and provide the information 35 for the information request 34. Alternatively, the vehicle owner may have already granted this consent in the past. The consent of the vehicle owner makes it possible for the current temperature to be recorded by the recording device 5 of the motor vehicle 2 and transmitted by the communication device 28 to the central controller 1. The central controller 1 provides the information 35 to the requesting unit 3. In this case, the requesting unit 3 is, in particular, a computer, a telephone, or a server of the weather service. The vehicle owner of the motor vehicle 2 and the operator of the central controller 1 may be remunerated for providing the information 35. In the case of small remuneration amounts, conventional payment systems are not economic, and therefore the remuneration may be made using a digital currency, for example, a cryptocurrency.

The requesting unit 3 may comprise an input device 31, an arithmetic unit 32, and/or a database 33. The requesting unit 3 may be designed as a computer, in particular, a personal computer, or as a server. The requesting unit 3 can transmit the information request 34 to the central controller 1 via the input device 31. Alternatively or additionally, the requesting unit 3 may be designed for automatically transmitting the information request 34, for example, depending on the calculation in the arithmetic unit 32 and/or a data value in the database 33.

The information request 34 may be or comprise a data packet. In particular, the information request 34 is communicated via a data signal. The information request 34 may, in particular, describe information 35 that is intended to be provided by the motor vehicle 2 or the central controller 1. The information request 34 may comprise account information relating to a user account of the requesting unit 3 or a user of the requesting unit 3. The information request 34 is, in particular, received by a first communications unit 13 of the central controller 1. The first communications unit 13 may comprise an interface for interacting with the data link 30, a transmission unit, and/or a receiving unit.

The central controller 1 further comprises an arithmetic unit 11. The arithmetic unit 11 can select the motor vehicle 2 from a plurality of motor vehicles for providing the information 35. The motor vehicle 2 is, in particular, selected according to a specified selection criterion. To select the motor vehicle 2 from the plurality of motor vehicles, the arithmetic unit 11 may be assigned a storage unit 10, in particular, a storage medium, for example, a hard disk, a flash memory, or a working memory. In particular, a database, which preferably comprises data relating to the plurality of motor vehicles, is stored on the storage unit 10. For example, a particular location, the presence of a device, in particular, a recording device 5, that is related to the information 35, and/or a consent value of a relevant vehicle owner of the motor vehicle 2 and/or for each motor vehicle from the plurality of motor vehicles, are stored in the database. In this case, the motor vehicle 2 can be selected from the plurality of motor vehicles on the basis of the data of the database, at least in part.

The specified selection criterion for selecting the motor vehicle 2 from the plurality of motor vehicles comprises, for example, the specification that the motor vehicle 2 be selected on the basis of the position of the motor vehicle 2, at least in part. The information 35 that is requested by the information request 34 may be related to the position of the motor vehicle 2. For example, a temperature value for a specific location, or a live image of a specific location, is requested as information 35 via the information request 34. The motor vehicle 2, of which the position describes that the motor vehicle 2 is located at the specified location, is preferably then selected.

Information 35, for the provision of which a device must be present in and/or on the motor vehicle 2, can be requested via the information request 34. In this case, the specified selection criterion may comprise the specification that the motor vehicle 2 be selected at least in part on the basis of whether said device is present in and/or on the motor vehicle 2. The specified selection criterion preferably comprises the specification that the motor vehicle 2 be selected on the basis of whether the vehicle owner of the motor vehicle 2 grants permanent consent for providing the information 35. In this case, the information 35 can be provided particularly quickly by the motor vehicle 2, since further interaction of the vehicle owner for the purpose of consent is not required.

In the present case, the central controller 1 comprises a second communications unit 12 that is designed to transmit the control signal, for controlling a recording device 5 of the selected motor vehicle 2, to the selected motor vehicle 2. The control signal can, for example, control recording of the information 35 by the recording device 5 of the motor vehicle 2. Alternatively or additionally, the control signal can control the provision and/or transmission of the information 35 by the recording device 5 of the motor vehicle 2. The motor vehicle 2 preferably receives the control signal via a communication device 28. The control signal preferably requests consent from the vehicle owner to record and/or transfer the information 35. The vehicle owner may confirm his consent via an input device of the motor vehicle 2, for example. Alternatively, the vehicle owner may have already granted his consent in advance, in particular, in a general manner, for transferring and/or recording the information 35. For example, in response to the control signal, the information 35 is recorded by the recording device 5 of the motor vehicle 2 and transmitted by the communication device 28 to the central controller 1.

The central controller 1 or the second communications unit 12 is, in particular, designed for at least partially wireless communication with the communication device 28 of the motor vehicle 2. For example, the second communications unit 12 is connected to a radio apparatus 18, in the present case, a transmission mast, via a wired connection 17. A radio link, for example via Wi-Fi or a mobile data link via the mobile phone network, can exist at least temporarily between the radio apparatus 18 and the communication device 28 of the motor vehicle 2. For example, the control signal is transmitted to the motor vehicle 2 or to the communication device 28 of the motor vehicle 2 via a first radio signal 19. The information 35 can be transmitted from the communication device 28 to the radio apparatus 18 or the second communications unit 12 or the central controller 1 via a second radio signal 29. In particular, the information 35 is ascertained by the central controller 1 by receiving the second radio signal 29.

In the present case, the motor vehicle 2 comprises a plurality of recording devices 5. For example, the motor vehicle 2 comprises a thermometer 20 as a recording device 5. The thermometer 20 can record a temperature value, in particular, an environment of the motor vehicle 2, as information 35. The motor vehicle 2 may comprise one or more cameras 22 as a recording device 5. In this case, for example, an image of the environment of the motor vehicle 2 can be recorded as information 35. For example, traffic data may be recorded by a traffic recording unit 23, for example, a speedometer, as information 35. For example, a speed of the motor vehicle 2 on a specified road may be recorded as information 35. A traffic jam situation at the position of the motor vehicle 2 can then be concluded by evaluating the speed of the motor vehicle 2.

The motor vehicle 2 preferably comprises a positioning device 21, in particular, a GPS receiver, as a recording device 5. The position of the motor vehicle 2 can preferably be part of the information 35, via the positioning device 21. The motor vehicle 2 preferably transmits its position to the central controller 1 via the communication device 28 continuously, periodically, and/or in response to a position request by the central controller 1. The position of the motor vehicle 2 can be received by the central controller 1 as a position signal and/or as information 35.

The central controller 1 may comprise an accounting device 14. For example, the accounting device 14 comprises a first counter 46 that is assigned to the requesting unit 3, a second counter 47 that is assigned to the motor vehicle 2 or to the vehicle owner of the motor vehicle 2, and/or a third counter 48 that is assigned to the central controller 1. A counter reading of the relevant counter 46, 47, 48 can characterize a particular credit status. In particular, the counter reading of one or more of the counters 46, 47, 48 can be changed by a specified value when the information 35 is recorded and provided. The specified value may be different for each of the counters 46, 47, 48. For example, the provision of the information 35 costs 0.10 €. In this case, the first counter 46 that is assigned to the requesting unit 3 can be reduced by the value 0.10 €. The counter readings of the other two counters 47, 48 can be increased, according to a pre-defined distribution specification, by a total of 0.10 €. For example, the counter reading of the second counter 47 is increased by the value 0.07 € and the counter reading of the third counter 48 is increased by the value 0.03 €. In this way, the vehicle owner of the motor vehicle 2 and/or the operator of the central controller 1 can be remunerated for providing the information 35. Alternatively or additionally, the remuneration can take place via an external accounting device 4. The external accounting device 4 comprises a first account 41 that is assigned to the requesting unit 3, a second account 42 that is assigned to the motor vehicle 2 or to the vehicle owner of the motor vehicle 2, and a third account 43 that is assigned to the central controller 1. In this case, the central controller 1 can transmit a remuneration signal to link the accounts 41, 42, 43. Linking the accounts 41, 42, 43 makes it possible for remuneration to be carried out according to the above-mentioned remuneration model.

After being received by the central controller 1 or the second communications unit 12, the information 35 can be transmitted by the central controller 1 or the first communications unit 13 to the requesting unit 3. In particular, the information 35 is transmitted to the requesting unit 3 in the form of a data signal.

Accordingly, the first communications unit 13 is used, in particular, for communication between the central controller 1 and the requesting unit 3, and the second communications unit 12 is used for communication between the central controller 1 and the motor vehicle 2. The plurality of motor vehicles may be located in an online group that is managed by the central controller 1. Each motor vehicle of the plurality of motor vehicles can be registered or have a vehicle account in said online group or in the central controller 1. The motor vehicles are, in particular, in constant contact with the central controller 1, in particular, to communicate status, position, and further state data. An external user can access and/or make the information request 34 to the online group or the central controller 1 via the requesting unit 3. If the information requested via the information request 34 can be provided by the central controller 1 or a motor vehicle 2 from the plurality of motor vehicles, remuneration can then be provided therefore. The central controller 1 is therefore used both for interaction with the requesting unit 3 and for interaction with the motor vehicle 2. In particular, the account 41, 42 is stored in the external accounting device 4 for the motor vehicle 2 and/or the requesting unit 3. The external accounting device 4 is, in particular, part of a cryptocurrency. The accounts 41, 42, 43 are, in particular, accounts in a cryptocurrency, for example, Bitcoin.

The invention claimed is:

1. A method for providing information by a motor vehicle, the method comprising:
    receiving, by a central controller that is outside the motor vehicle and that comprises a server, an information request from a requesting unit, wherein the requesting unit is configured as a further server remote from the central controller;

receiving, by the central controller, a corresponding position of each motor vehicle of a plurality of motor vehicles, wherein the receiving is continuous, periodic, or in response to a position request by the central controller;

selecting, by the central controller, a selected motor vehicle from the plurality of motor vehicles in accordance with a specified selection criterion, wherein the specified selection criterion comprises a specification that the selected motor vehicle be selected as the motor vehicle on a basis of the corresponding position of the motor vehicle;

transmitting, by the central controller to the selected motor vehicle, a control signal for controlling a recording device of the selected motor vehicle;

receiving, by the central controller, information recorded as a result of the control signal from the recording device of the selected motor vehicle;

communicating, by the central controller, the information to the requesting unit, wherein environment data are recorded as the information, and wherein the environment data comprise a temperature as a measured variable of an environment of the motor vehicle; and changing, by the central controller, a counter of the central controller that is related to the motor vehicle, wherein the counter is changed by a specified value when the information is provided.

2. The method of claim 1, further comprising:

selecting, by the central controller, the selected motor vehicle from the plurality of motor vehicles, wherein the specified selection criterion comprises a specification that the motor vehicle be selected on a basis of: consent of a vehicle owner of the motor vehicle to provide the information, or a presence in or on the motor vehicle of a device related to the information.

3. The method of claim 1, further comprising:

performing a remuneration process, by an accounting device of the requesting unit, which is coupled to an accounting device of the motor vehicle, when the information is requested by the requesting unit or provided by the selected motor vehicle.

4. The method of claim 1, wherein the controlling of the recording device comprises:

controlling, by the control signal, at least one sensor of the recording device of the motor vehicle for recording the information.

5. The method of claim 1, wherein traffic data or route data are recorded as the information.

6. The method of claim 2, further comprising:

requesting consent, using the control signal, from the vehicle owner to record or transfer the information.

7. The method of claim 1, wherein the requesting unit is a personal computer or a mobile terminal.

8. A central controller that is outside a motor vehicle and comprises a server and a plurality of processors, wherein the central controller is configured to provide information via the motor vehicle, and wherein the central controller further comprises:

a first communications unit, having a first processor of the plurality of processors, configured to receive an information request from a requesting unit and communicate the information to the requesting unit, wherein the requesting unit is configured as a further server remote from the central controller;

an arithmetic unit, having a second processor of the plurality of processors, configured to select the motor vehicle from a plurality of motor vehicles in accordance with a specified selection criterion, wherein the specified selection criterion comprises a specification that the motor vehicle be selected on a basis of a position of the motor vehicle; and a second communications unit, having a third processor of the plurality of processors, configured to transmit, to the selected motor vehicle, a control signal for controlling a recording device of the selected motor vehicle, and to receive the information, recorded as a result of the control signal, from the recording device of the selected motor vehicle, wherein the central controller is further configured to receive a corresponding position of each of the plurality of motor vehicles continuously, periodically, or in response to a position request by the central controller, wherein the information that is recorded relates to environment data, wherein the environment data comprise a temperature as a measured variable of an environment of the motor vehicle, wherein the central controller is further configured to change a counter of the central controller that is related to the motor vehicle, wherein the counter is changed by a specified value when the information is provided.

9. The central controller of claim 8, further configured to:

select the selected motor vehicle from the plurality of motor vehicles, wherein the specified selection criterion comprises a specification that the selected motor vehicle be selected on a basis of: consent of a vehicle owner of the motor vehicle to provide the information, or a presence in or on the motor vehicle of a device related to the information.

10. The central controller of claim 8, wherein to control the recording device, the central controller is further configured to:

control, by the control signal, at least one sensor of the recording device of the motor vehicle for recording the information.

11. The central controller of claim 8, wherein the information that is recorded is traffic data or route data.

12. The central controller of claim 9, further configured to:

request consent, using the control signal, from the vehicle owner to record or transfer the information.

* * * * *